Aug. 17, 1948.     E. F. SLEDGE     2,447,213
MUSICAL EDUCATIONAL APPLIANCE
Filed Sept. 15, 1945
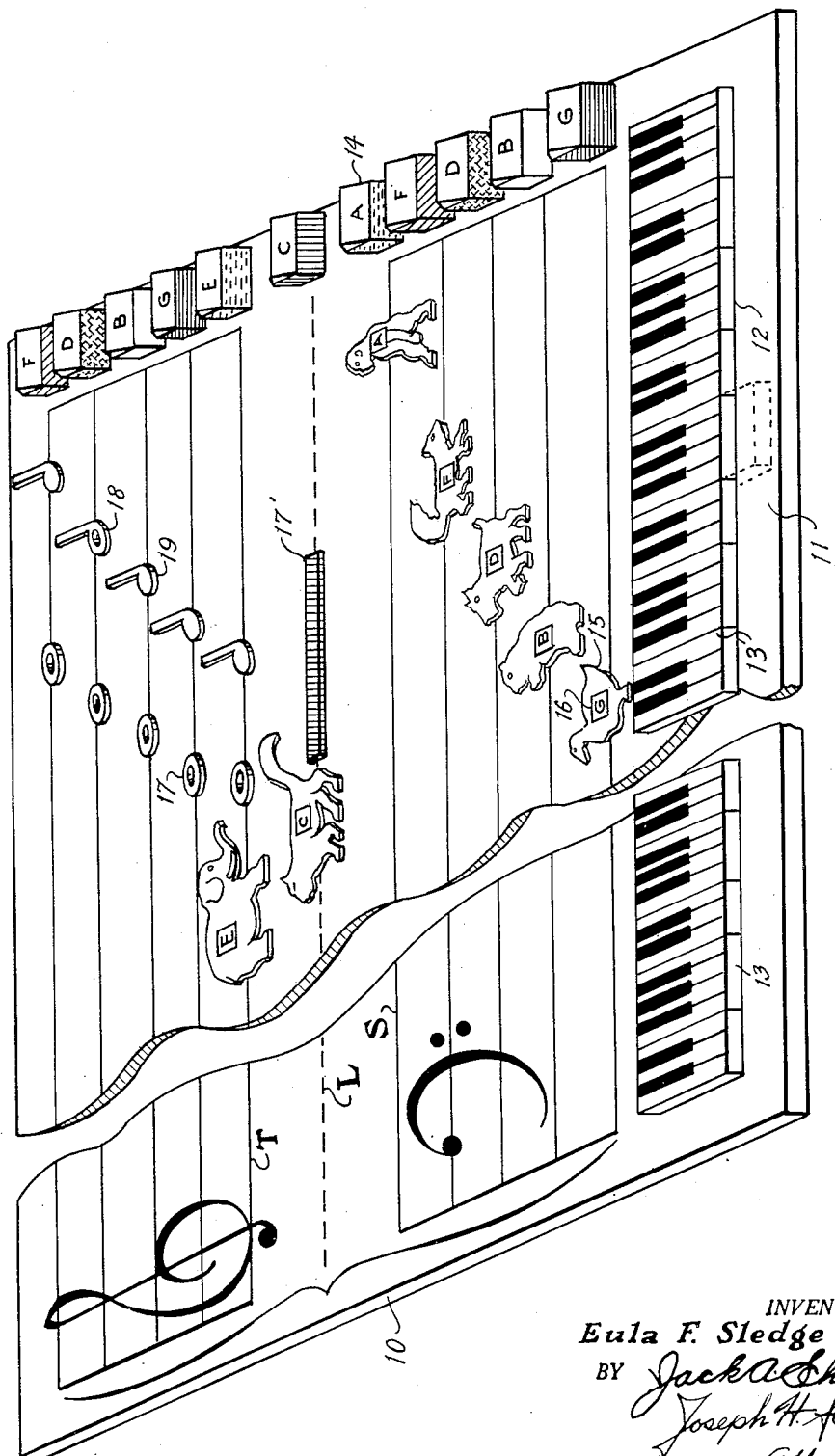
INVENTOR.
Eula F. Sledge
BY Jack A. Schley
Joseph H. Schley
Attorneys

UNITED STATES PATENT OFFICE 2,447,213

MUSICAL EDUCATIONAL APPLIANCE

Eula F. Sledge, Dallas, Tex.

Application September 15, 1945, Serial No. 616,509

4 Claims. (Cl. 84—470)

This invention relates to new and useful improvements in musical educational appliances.

One object of the invention is to provide an improved educational appliance whereby children of pre-school age may be taught the simple rudiments of music and given a knowledge of the sight-reading of the grand staff and its correlation to the keyboard of a musical instrument.

A further object of the invention is to provide an improved musical educational appliance involving a chart having printed thereon the treble and bass staffs and movable pieces depicting objects, characters, notes and the keys of a keyboard, whereby manipulation of said movable pieces with respect to the staffs of the chart may be utilized to teach children of pre-school age a knowledge and foundation of sight-reading and keyboard relations.

Another object of the invention is to provide an improved and simple musical educational device having a plurality of shiftable and removable pieces correlated with the known color values of musical tones and also, whereby said pieces be maneuvered and associated in a manner readily apparent to the mind of a pre-school age child.

A construction designed to carry out the invention will be hereinafter described together with other features of the invention.

The invention will be more readily understood from a reading of the following specification and by reference to the accompanying drawing, wherein an example of the invention is shown, and wherein the figure of the drawing is an isometric view of a printed chart having movable pieces constructed in accordance with the invention.

In the drawings, the numeral 10 designates a rectangular board on which is printed a treble staff T and a bass staff S. In describing the invention, the staff lines will be referred to by their letters, as for instance, the G line or the D line, and so on. Below the bass staff, an elongate space 11 is provided for the reception of key pieces or blocks 12 and 13 respectively. Each block 12 is printed to represent three black keys designating sharps and flats, and four white keys of the key board, while the blocks 13 are printed to represent two black keys and three white keys. These blocks are assembled to represent a keyboard, but any one of the blocks may be moved independently of the others, as indicated in dotted lines.

At the end of each staff line, a movable block 14 is placed on the board and each of these blocks is made in the form of a house. On the roof of each house, a letter is printed or painted, designating the staff line to which the house belongs. It is well known that musical tones have color values, and the invention has been developed with these values in mind; for instance, the G house of S staff is colored blue, and the other houses colored as follows; B white, D white, D orange, F green, A purple, and E yellow. Between the staffs T and S, a dash line L is printed and a block 14 depicting a house colored red and with the letter C on the roof thereof, is placed at the end of this line, which represents middle C.

In using the appliance, advantage is taken of the child's knowledge of the animal kingdom. The pupil, whose age is usually three to five years, is taught to call the staff T "Treble Town" and the staff S "Bass Town." The line L is designated "Kitty Cat." Movable flat pieces 15 are cut to the outlines of various animals and each piece is provided with a colored panel 16 bearing a staff letter. The lines of the staffs are referred to as "streets." For each piece, an animal is selected, the first letter of whose name is the letter printed in the panel 16. For instance, the piece associated with the G line represents a goose and the panel 16 thereof is colored blue. The pupil is taught that the line is G street and that at the end of the street is the house in which Mr. Goose lives, and his attention is called to the fact that the house is a little blue house and thus, Mr. Goose lives in a little blue house on G street.

The other pieces are made respectively to represent a bear, a dog, a fox, an ape, a cat and an elephant and the panel 16 of each piece bears the first letter of the name of the particular animal and is colored to match the house at the end of the street. An elongate flat bar 17', which is colored red, is placed on the line L so as to match the C house at the end of this line. The child is taught to place the blocks 14, pieces 15 and bar 17' on the proper lines. The pupil learns to sight-read the lines of the staffs by animal names, because the letters of the alphabet are not yet within his knowledge. After a few lessons, the pupil learns to place the pieces and blocks on the proper lines of the staffs.

After the pupil learns to correlate the individual animal pieces and the house blocks with their respective staff lines, the pieces 15 are removed from the board and removable pieces 17, 18 and 19 are placed on the staff.

The piece 17 represents a whole note, the piece 18 a half note, and the piece 19 a quarter note. The teacher places these note pieces on different streets and impresses upon the mind of the pupil that no matter what kind of a piece is placed on a particular street or line, as for instance the F line, the street is still Mr. Fox's street and in this way the pupils learns to associate the notes with the staff lines and the houses.

The next step is to teach the pupil to correlate the written page of music to the keyboard. The teacher picks up Mr. Goose's house and places it on one of the blocks 12, telling the pupil that the keyboard is known as "Keyboard Town" and that Mr. Goose's relatives live in "Keyboard Town." This same procedure is carried out with the other houses. The red "Kitty Cat" house is taken from the middle C line and placed on the middle C key block 13' and the pupil is told that "Kitty Cat's" relatives live in "Keyboard Town."

As pointed out, most of the pupils have not learned the alphabet, but most of them have learned the simple animal names and they thus sight-read the staffs by the use of animal names instead of by letters. The child is gradually led into the alphabet and soon learns that the name "Goose" stands for G and the street G stands for the line G on the staff. The appliance is best suited to children 3, 4 and 5 years of age. From this simple and childlike foundation, the teacher may readily continue the musical education with advanced methods and systems.

The simplicity and flexibility of the appliance has proven to be of great importance. One of the key blocks 12 may be slid downwardly as indicated in dotted lines, one of the houses placed on this block and the pupil given a lesson on the musical components of this group in a simple manner readily understandable to a child of preschool age.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a musical educational appliance, the combination with a chart having printed thereon music staffs, of movable animal-shaped pieces adapted to be placed on the staffs having designations identifying them with particular lines of the staffs, said pieces being freely movable when placed on the staffs, and freely movable blocks adapted to be placed at the ends of each of the staff lines and having a configuration distinguishing them from the pieces, said blocks each having the same designation as the piece placed on its correlated staff line, whereby each block is correlated with an individual piece to visually teach the musical staffs.

2. A musical educational appliance as set forth in claim 1, wherein the chart has a middle C line between the staffs, a freely movable piece distinguishable from the other pieces adapted to be placed on the middle C line, and a block distinguishable from the other blocks adapted to be placed at the end of the middle C line.

3. A musical appliance as set forth in claim 1, and note pieces adapted to be placed on the staff lines.

4. In a musical educational appliance, the combination with a chart having printed thereon music staffs, of movable animal-shaped pieces adapted to be placed on the staffs having designations identifying them with particular lines of the staffs, said pieces being freely movable when placed on the staffs, freely movable blocks adapted to be placed at the ends of each of the staff lines and having a configuration distinguishing them from the pieces, said blocks each having the same designation as the piece placed on its correlated staff line, whereby each block is correlated with an individual piece to visually teach the musical staffs, and key pieces adapted to be placed along the chart below the staffs.

EULA F. SLEDGE.

REFERENCES CITED

The following references are of record in the file of this patent:

UNITED STATES PATENTS

| Number | Name | Date |
| --- | --- | --- |
| 708,139 | Holvarsen | Sept. 2, 1902 |
| 1,412,587 | Willoughby | Apr. 11, 1922 |
| 1,527,824 | Armstrong | Feb. 24, 1925 |
| 2,164,873 | Everson | July 4, 1939 |
| 2,236,638 | Adams | Apr. 1, 1941 |
| 2,315,793 | Joy | Apr. 6, 1943 |